(12) United States Patent
Oranskiy et al.

(10) Patent No.: US 9,019,147 B1
(45) Date of Patent: Apr. 28, 2015

(54) SYSTEM AND METHOD FOR DISPLAYING WEATHER INFORMATION

(75) Inventors: Alexander M. Oranskiy, Melbourne, FL (US); Mark B. Godfrey, Melbourne, FL (US); Patricia R. Barbosa, Rockledge, FL (US); James D. Cahoon, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 505 days.

(21) Appl. No.: 13/361,804

(22) Filed: Jan. 30, 2012

(51) Int. Cl.
*G01S 13/08* (2006.01)
*G01S 17/95* (2006.01)
*G01S 13/95* (2006.01)

(52) U.S. Cl.
CPC .............. *G01S 17/95* (2013.01); *G01S 13/953* (2013.01)

(58) Field of Classification Search
CPC .......... G01S 13/953; G01S 7/04; G01S 7/18; G01S 17/58; G01S 17/93; G01S 17/95
USPC .......................................................... 342/26
See application file for complete search history.

(56) References Cited

U.S. PATENT DOCUMENTS

| 8,135,500 | B1 * | 3/2012 | Robinson ........................... 701/3 |
| 2008/0148839 | A1 * | 6/2008 | Tillotson et al. ............ 73/170.16 |
| 2009/0143988 | A1 * | 6/2009 | Tillotson ........................... 702/3 |
| 2010/0019938 | A1 * | 1/2010 | Bunch ........................... 340/963 |
| 2010/0194628 | A1 * | 8/2010 | Christianson et al. ....... 342/26 B |

* cited by examiner

*Primary Examiner* — Timothy A Brainard
(74) *Attorney, Agent, or Firm* — Angel N. Gerdzhikov; Donna P. Suchy; Daniel M. Barbieri

(57) ABSTRACT

Provided in one embodiment is a weather radar system, comprising: processing electronics configured to: determine (i) a presence of a turbulence at a target based on the weather radar return data received from an input device as a result of at least one scan of the target and (ii) positional information, which comprises at least one altitudinal coordinate of at least one of the target and the turbulence; and display the positional information with respect to the weather radar system on a weather image on a vertical situation display.

19 Claims, 10 Drawing Sheets

SYSTEM AND METHOD FOR DISPLAYING WEATHER INFORMATION

BACKGROUND

The present applications is related to weather radar systems. In general, airborne weather radar systems display weather radar return information in plan view on a horizontal weather display. In deciding whether to fly around or climb over a weather cell, a pilot may additionally want vertical information (or information with respect to altitude) about the cell. A conventional advanced system can provide a profile or elevation view of weather on a vertical situation display ("VSD"), but is not equipped to depict information on the VSD related to certain weather patterns such as turbulence. While the turbulence is not displayed on the VSD of the conventional advanced system, the turbulence information is outputted from the radar system to a horizontal situation display ("HSI") and/or map. As a result, inconsistent information is provided by two disparate systems to the user (e.g., pilot).

Thus, there is a need to provide an improved aviation system that is equipped to display vertical weather information, including turbulence information.

SUMMARY

Provided in one embodiment herein is an airborne weather radar system. One embodiment provides systems and methods related to depiction of weather information, particularly turbulence, on a vertical situation display.

One embodiment provides a weather radar system, the system comprising: processing electronics configured to: determine (i) a presence of a turbulence at a target based on the weather radar return data received from an input device as a result of at least one scan of the target and (ii) positional information, which comprises at least one altitudinal coordinate of at least one of the target and the turbulence; and display the positional information with respect to the weather radar system on a weather image on a vertical situation display.

Another embodiment provides a method for displaying weather information at a target, the method comprising: determining (i) a presence of a turbulence at a target based on the weather radar return data received from an input device as a result of at least one scan of the target and (ii) positional information, which comprises at least one altitudinal coordinate of at least one of the target and the turbulence; and displaying the positional information with respect to the weather radar system on a weather image on a vertical situation display.

Another embodiment provides a non-transitory computer readable medium having instructions stored therein, the instructions being executable by at least one processor to execute a method of displaying weather information on an aviation display, the method comprising: determining (i) a presence of a turbulence at a target based on the weather radar return data received from an input device as a result of at least one scan of the target and (ii) positional information, which comprises at least one altitudinal coordinate of at least one of the target and the turbulence; and displaying the positional information with respect to the weather radar system on a weather image on a vertical situation display.

DETAILED DESCRIPTION

Weather Radar System

One aspect of the disclosure provided herein is related to systems and methods for enabling display of weather information, particularly that related to turbulence, on a vertical situation display ("VSD"). The VSD may be, for example, aboard an aircraft or a component of a flight simulator.

An airborne weather radar system is generally configured to project radar beams and to receive radar returns relating to the projected radar beams. The projected radar beams generally pass through air and reflect off of precipitation (e.g., rain, snow, etc.), other aircraft, and terrain (e.g., a mountain, a building, etc.). An airborne weather radar system may be configured to scan weather at various angles relative to horizontal and to determine the altitude of an echo top of a cell. In one embodiment, the echo top is the highest part of the cell having a reflectivity above a certain signal-to-noise ratio (e.g., 18.5 dBZ) and is usually associated with the top of the precipitation within a cell, which in turn usually correlates to the strength of the cell.

In some embodiments, weather radar systems are configured to display information corresponding to radar return data in plan view on a horizontal weather display. The systems and methods described herein may generate an image including a plan view of the weather. In some embodiments, a user may select or identify a cell via a user interface device (e.g., cursor control device, touchscreen, etc.).

Figure 1:
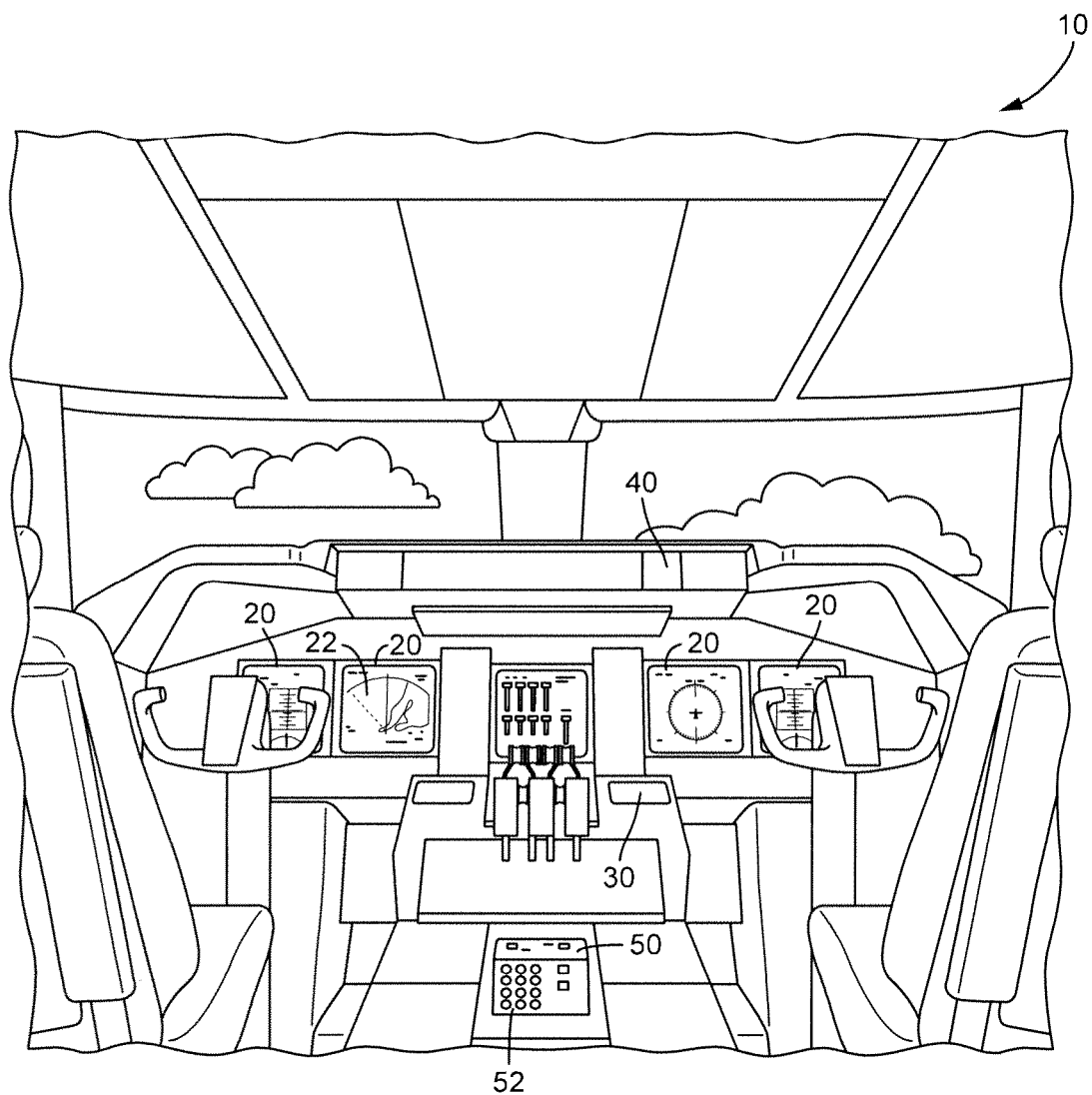
FIG. 1 is a schematic illustration of an aircraft control center according to an exemplary embodiment.

FIG. 1 provides an illustration of an aircraft control center or cockpit 10 in one embodiment. Aircraft control center 10 includes flight displays 20 which are generally used to increase visual range and to enhance decision-making abilities. In some embodiments, flight displays 20 may provide an output from a radar system of the aircraft. For example, flight displays 20 may provide a top-down view, a horizontal view, or any other view of weather and/or terrain detected by a radar system on the aircraft. The views of weather may include monochrome or color graphical representations of the weather. Graphical representations of weather may include an indication of altitude (or altitudinal coordinates) of those objects or the altitude relative to the aircraft. Flight displays 20 may further include a touch sensitive surface 22 configured to receive touch gestures relative to the images shown on display 20. Aircraft control center 10 may further include other user interface elements such as an audio device 30 (e.g., speaker, electro-acoustic transducer, voice command recognition device, etc.), illuminating or flashing lamps 40, and a cursor control device 50. Cursor control device 50 may include knobs and buttons configured to move a cursor on display 20, navigate through lists of information, and to make selections. The buttons of cursor control device 50 may constitute a keypad 52 configured to enable a user to type information for entry into the processing electronics system, for example, to enter latitudinal and longitudinal coordinates.

Figure 2:
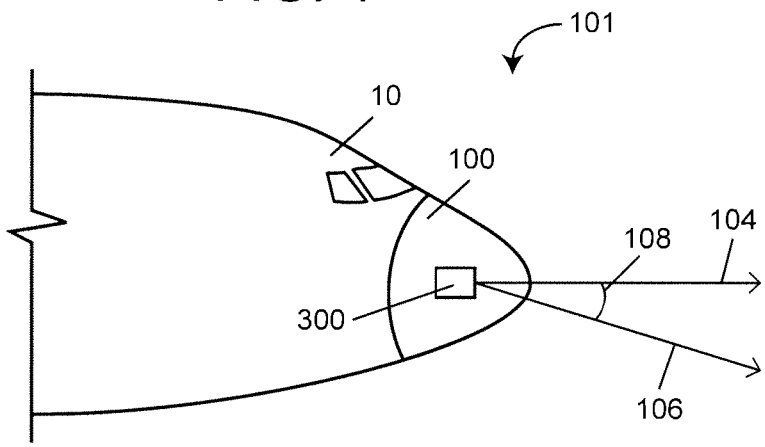
FIG. 2 is a schematic illustration of the nose of an aircraft including a weather radar system according to an exemplary embodiment.

FIG. 2 provides an illustration of the front of an aircraft 101, with aircraft control center 10 and nose 100, according to an exemplary embodiment. A radar system 300 (e.g., a weather radar system or other radar system) may be located within nose 100 of aircraft 101 or within aircraft control center 10 of aircraft 101. According to various exemplary embodiments, radar system 300 may be located on the top of aircraft 101 or on the tail of aircraft 101 instead. Radar system 300 may include or be coupled to an antenna system. The antennas and radar systems described herein can refer to a variety of different antennas or radar systems—e.g., a split aperture antenna, a monopulse antenna, a sequential lobbing antenna, etc. System 300 may include electronics 304, sensors 314, equipment 312, and/or display 20.

Figure 5:
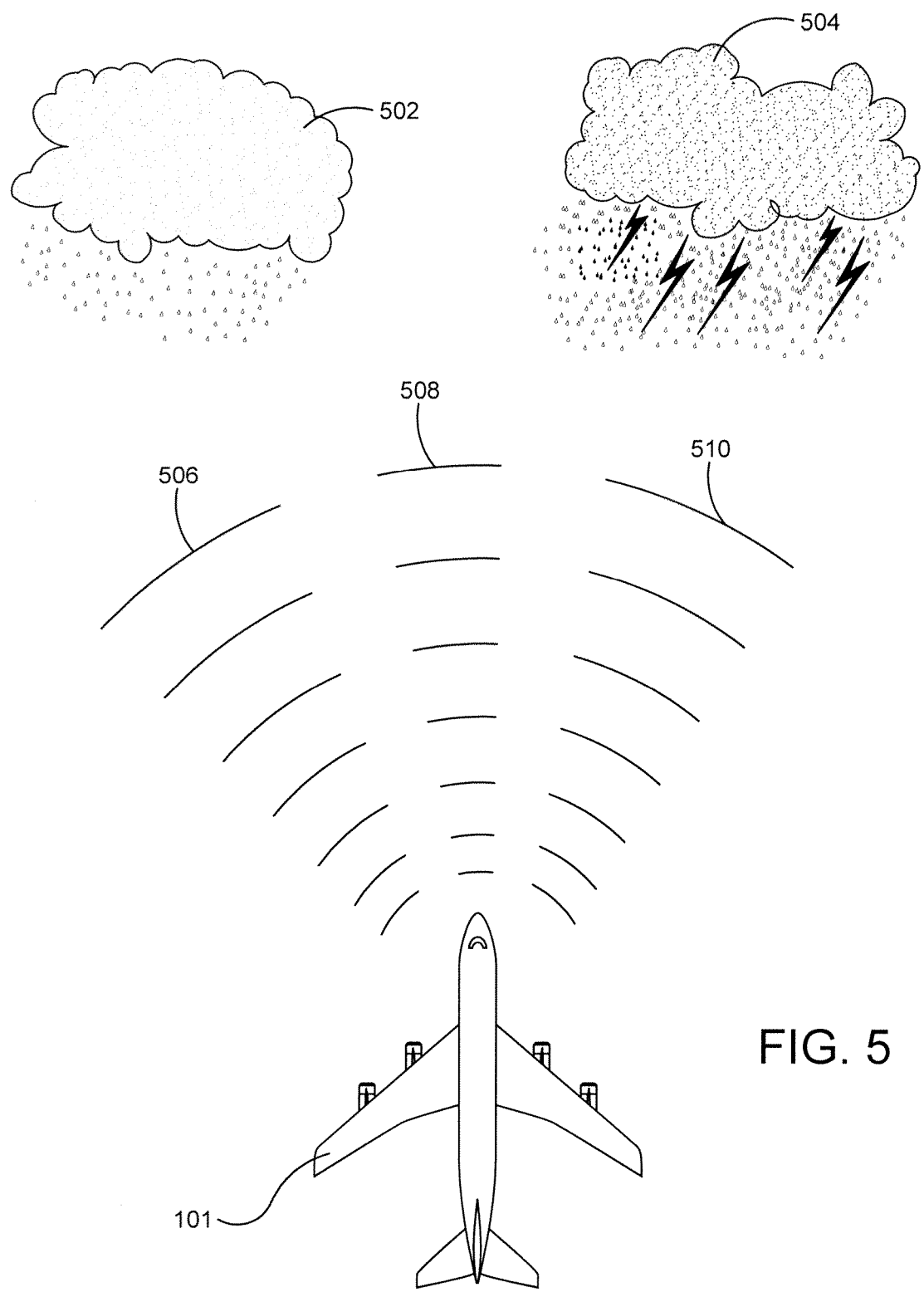
FIG. 5 is a schematic plan view illustration of an aircraft radar system scanning weather according to an exemplary embodiment.

In some embodiments, radar system 300 sweeps a radar beam horizontally back and forth across the sky, see FIG. 5. Depending on the application and system, the radar system may contain one or more radar beams—e.g., two, three, four, five, or more. Some radar systems will conduct a first horizontal sweep 104 directly in front of aircraft 101 and a second horizontal sweep 106 upward or downward at some tilt angle 108 (e.g., 20 degrees down). Returns (or "return data") from different tilt angles can be electronically merged to form a composite image for display on an electronic display shown, for example, in FIG. 1. Returns can also be processed, for example, to distinguish between terrain and weather, to determine the height (e.g., altitude) of terrain, or to determine the height of weather. In some embodiments, radar system 300 may be a WXR-2100 MultiScan™ radar system or similar system manufactured by Rockwell Collins configured as described herein. In other embodiments, radar system 300 may be an RDR-4000 system or similar system manufactured by Honeywell International, Inc. configured as described herein. In some other embodiments, radar system 300 may include a terrain awareness and warning system (TAWS) and coordinate with associated user interface elements in aircraft control center 10 (e.g., flashing lights 40, displays 20, display elements on a weather radar display, display elements on a terrain display, audio alerting devices 30, etc.) configured to warn the pilot of potentially threatening terrain features.

Figure 3:
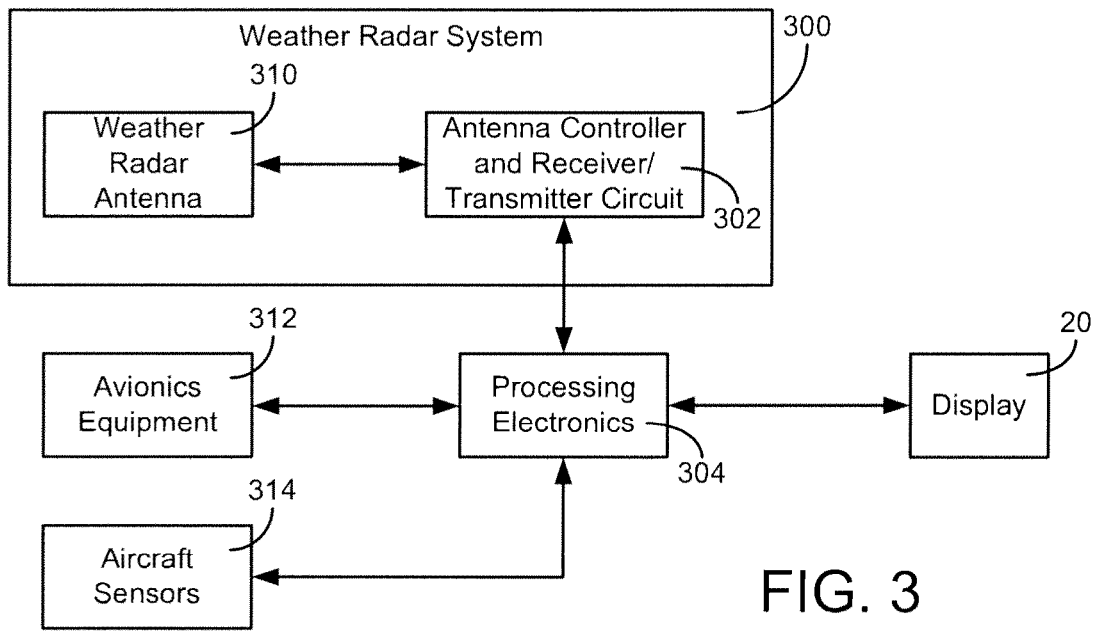
FIG. 3 is a block diagram of a weather radar system according to an exemplary embodiment.

FIG. 3 provides a block diagram of a weather radar system 300 in one exemplary embodiment. In some embodiments, weather radar system 300 may include a weather radar antenna 310 connected (e.g., directly, indirectly) to an antenna controller and receiver/transmitter circuit 302. Antenna controller and receiver/transmitter circuit 302 may include any number of mechanical or electrical circuitry components or modules for steering a radar beam. For example, circuit 302 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 302 may be configured to conduct the actual signal generation, which may result in a radar beam being provided from weather radar antenna 310, and to conduct the reception of radar return data received at radar antenna 310. Radar return data are provided from circuit 302 to processing electronics 304 for processing. For example, processing electronics 304 can be configured to interpret the returns for display on display 20.

Processing Electronics

Processing electronics 304 can also be configured to provide control signals or control logic to circuit 302. For example, depending on the pilot or situational inputs, processing electronics 304 may be configured to cause circuit 302 to change behavior or radar beam patterns. In other words, processing electronics 304 may include the processing logic for operating weather radar system 300. In some embodiments, the processing electronics 304 may be integrated into radar system 300 or located remotely from radar system 300, for example, in aircraft control center 10.

Processing electronics 304 are further shown as connected to aircraft sensors 314, which may include any number of sensors configured to provide data to processing electronics 304. For example, sensors 314 could include temperature sensors, humidity sensors, infrared sensors, altitude sensors, a gyroscope, a global positioning system (GPS), or any other aircraft-mounted sensors that may be used to provide data to processing electronics 304. It should be appreciated that sensors 314 (or any other component shown connected to processing electronics 304) may be indirectly or directly connected to processing electronics 304. Processing electronics 304 may be connected to avionics equipment 312. Avionics equipment 312 may be or include a flight management system, a navigation system, a backup navigation system, or another aircraft system configured to provide inputs to processing electronics 304.

Figure 4:
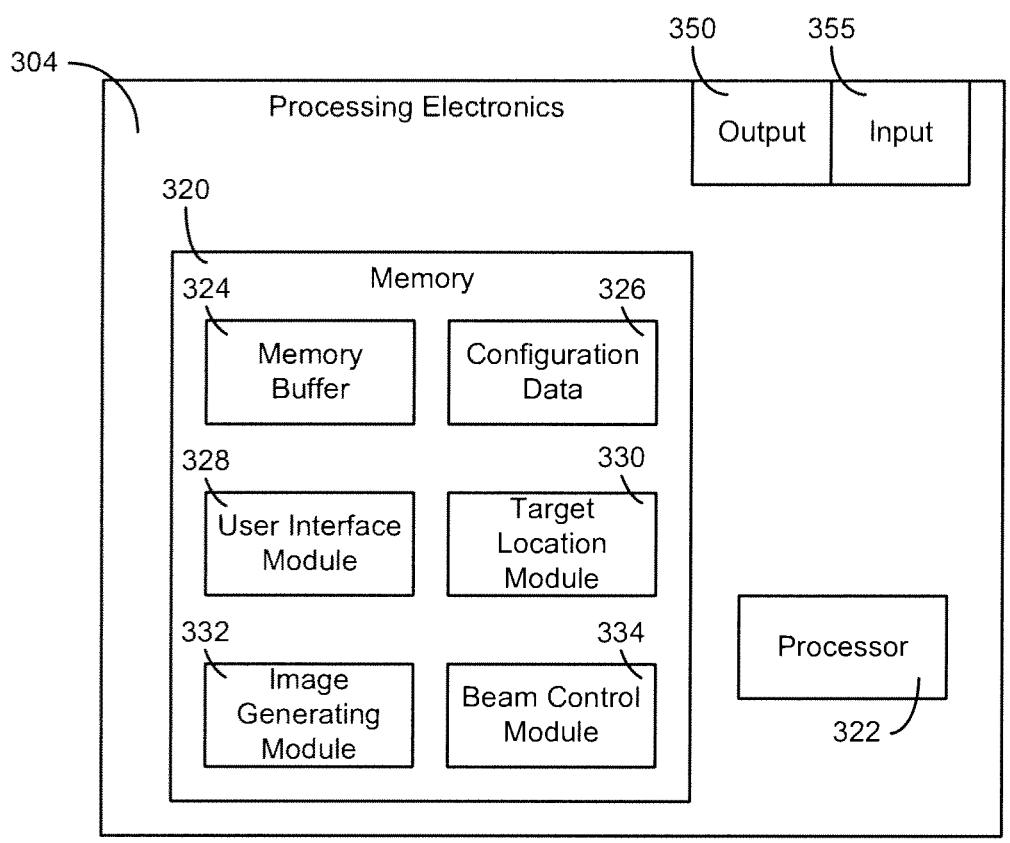
FIG. 4 is a block diagram of the processing electronics of the weather radar system of FIG. 3 according to an exemplary embodiment.

FIG. 4 provides a detailed block diagram of processing electronics 304 of FIG. 3 in one exemplary embodiment. Processing electronics 304 includes a memory 320 and processor 322. Processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to perform the processes and/or to complete and facilitate the activities described herein. Memory 320 can be any volatile or non-volatile memory device capable of storing data or computer code relating to the activities described herein. For example, memory 320 is shown to include modules 328-334 which are computer code modules (e.g., executable code, object code, source code, script code, machine code, etc.) configured for execution by processor 322.

In some embodiments, when executed by processor 322, processing electronics 304 are configured to execute and/or complete the processes described herein. In some embodiments, processing electronics 304 includes hardware circuitry for supporting the execution of the computer code of modules 328-334. For example, processing electronics 304 includes hardware interfaces (e.g., output 350) for communicating control signals (e.g., analog, digital) from processing electronics 304 to circuit 302 or to display 20. Processing electronics 304 may also include an input 355 for receiving, for example, radar return data from circuit 302, feedback signals from circuit 302 or for receiving data or signals from other systems or devices.

In some embodiments, memory 320 may include a memory buffer 324 for receiving radar return data. The radar return data may be stored in memory buffer 324 until buffer 324 is accessed for data. For example, a user interface module 328, target location module 330, image generating module 332, beam control module 334, or another process that utilizes radar return data may access buffer 324. The radar return data stored in memory 320 may be stored according to a variety of schemes or formats. For example, the radar return data may be stored in an x,y or x,y,z format, a heading-up format, a north-up format, a latitude-longitude format, or any other suitable format for storing spatial-relative information.

In some embodiments, memory 320 may include configuration data 326. Configuration data 326 includes data relating to weather radar system 300. For example, configuration data 326 may include beam pattern data which may be data that a beam control module can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like. Configuration data 326 may also include data (e.g., threshold values, model information, look up tables, and the like) used by modules 328-334 to determine and display the altitude value of an echo top of a weather cell.

In some embodiments, memory 320 may include a user interface module 328, which includes logic for interpreting signals and/or data received from a user interface (e.g., user input device, cursor control device, keyboard or keypad, touchscreen, etc.). For example, user interface module 328 may be configured to interpret signals from a user input device as coordinates (e.g., latitude and longitude, direction and distance, etc.). For example, user interface module 328 may be configured to interpret user input data to determine the location of a cursor on a display 20 and the relationship between the cursor and an image on the display 20. For example, user interface module 328 may be configured to interpret user input data to determine various gestures (e.g., drag versus swipe versus tap), the direction of gestures, the relationship of these gestures to images, and the location of these gestures on a touch sensitive surface 22. In some other embodiments, user interface module 328 may include touchscreen operational data which may be data regarding the size, resolution, and sensitivity of a touchscreen, and the like, which can be used to interpret user input data from memory buffer 324 or a touch sensitive surface 22 on display 20. For example, user interface module 328 may be configured to provide information (e.g., cursor information) to image generating module 332. User interface module 328 may be further configured to convert a target selection by a user into data usable by target location module 330 (e.g., x,y format, grid location, or other suitable spatial relationship format) and to provide the data to target location module 330.

In some embodiments, memory 320 may include a target location module 330, which includes logic for using data from user interface module 328 and transforming the data into target information usable by beam control module 334 or circuit 302 to direct a radar beam toward the target. For example, target location module 330 may be configured to receive image information from image generating module 332 and to correlate the image information with target selection data received from user interface module 328, thereby calculating a relative location of the target to aircraft 101. Target location module 330 may be further configured to derive the absolute location of the target based on an absolute location of aircraft 101, a heading of aircraft 101, and a relative location of the target to aircraft 101. In some other embodiments, target location module 330 may be configured to generate target information including direction and distance coordinates oriented to the aircraft from latitudinal and longitudinal coordinates received from user interface module 328. Target location module 330 may be configured to provide target location information to beam control module 334.

In some embodiments, memory 320 may include an image generating module 332, which includes logic for using radar returns in memory buffer 324 to generate an image of the weather. For example, image generating module 332 may use radar returns to generate a plan view of weather detected by radar system 300. Image generating module 332 may be configured to receive an echo top altitude value from memory buffer 324 or radar system 300 and to generate an image including the altitude value and a plan view of the weather. Image generating module 332 may be configured to cause the image to be displayed on an aviation display 20. Image generating module 332 may further be configured to integrate or overlay the altitude value onto the plan view of the weather in a region of the plan view corresponding to the selected target. Image generating module 332 may include operational data including information regarding size, resolution, refresh rates, and orientation of aviation displays 20.

Figure 6:
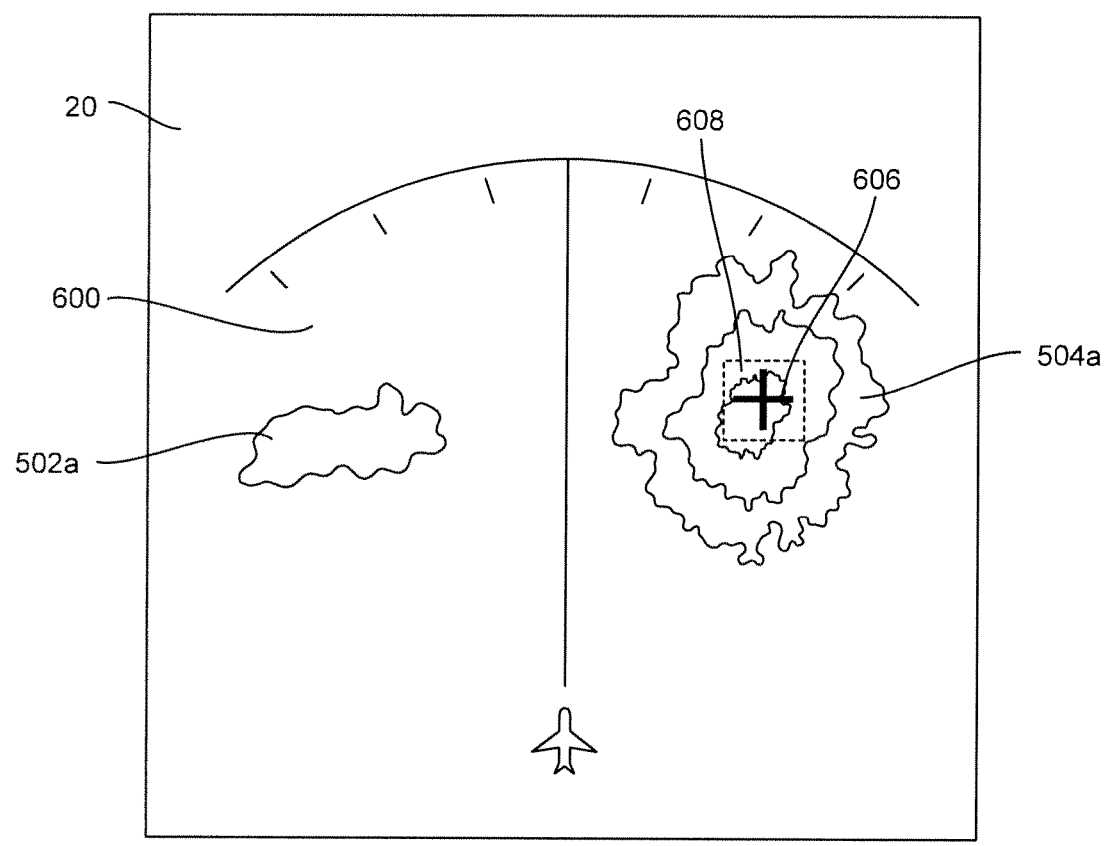
FIG. 6 is a schematic illustration of an aviation display showing a plan view of weather according to an exemplary embodiment.
Figure 7A:
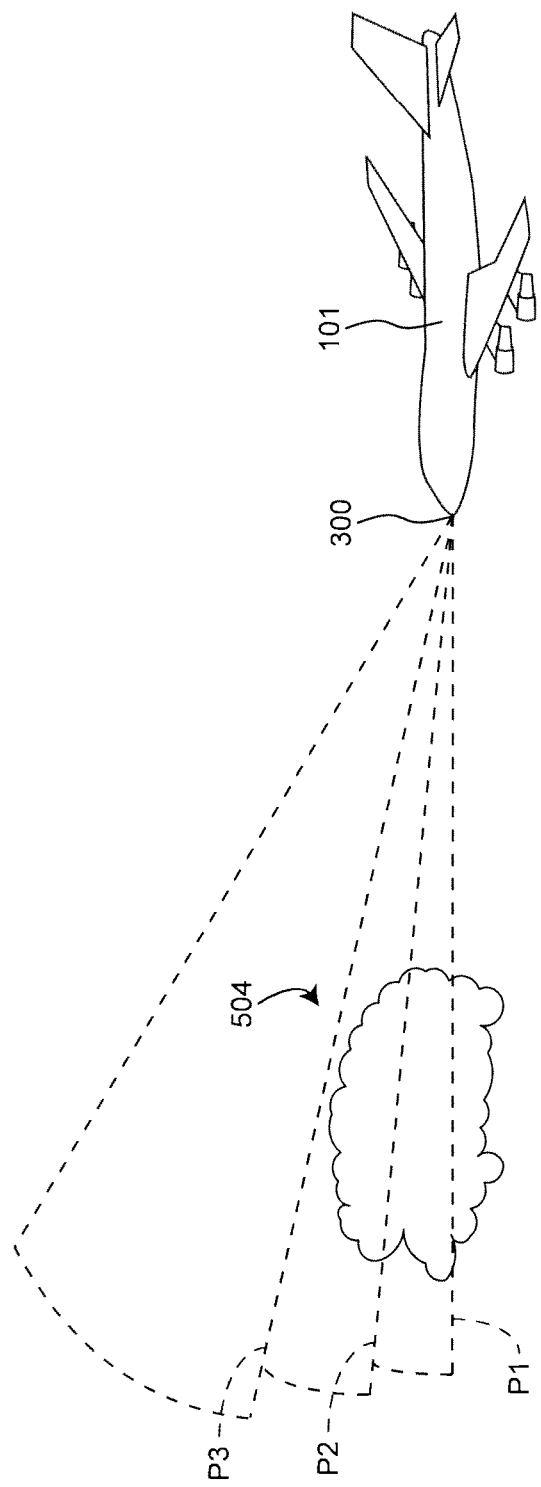
FIGS. 7(a)-7(b) provide schematic elevation view illustrations of an aircraft scanning a weather cell in horizontal and vertical directions, respectively, according to an exemplary embodiment.
Figure 7B:
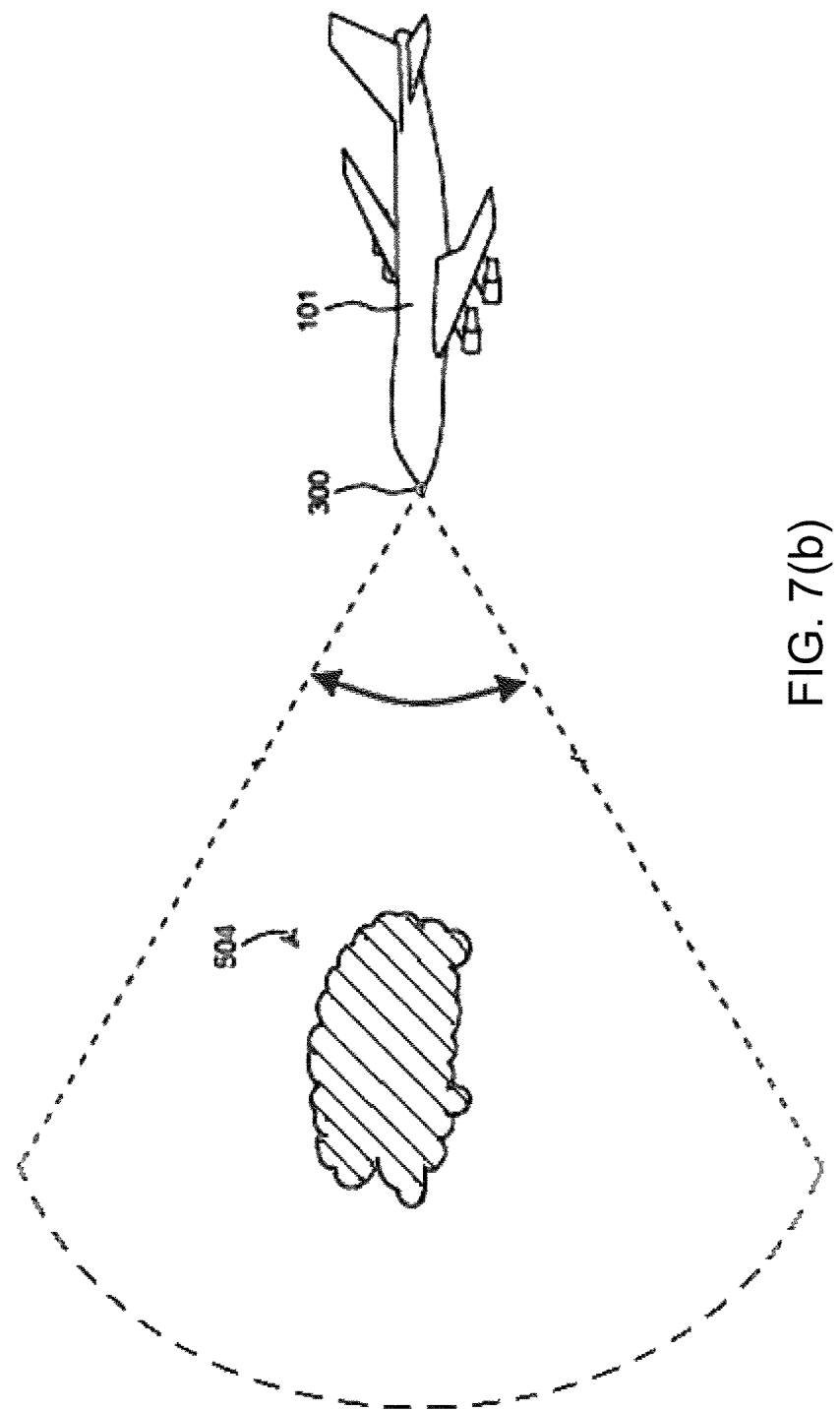

In some embodiments, memory 320 may include a beam control module 334, which includes logic for providing target location information to circuit 302. For example, beam control module 334 may be an algorithm for commanding circuit 302 to sweep a radar beam. Beam control module 334 may be used, for example, to send one or more analog or digital control signals to circuit 302. The control signals may be, for example, an instruction to move the antenna mechanically, an instruction to conduct an electronic beam sweep in a certain way, an instruction to move the radar beam to the left by five degrees, etc. Beam control module 334 may be configured to control timing of the beam sweeps or movements relative to aircraft speed, flight path information, transmission or reception characteristics from weather radar system 300 or otherwise. Beam control module 334 may receive data from configuration data 326 for configuring the movement of the radar beam. Beam control module 334 may further be configured to cause radar system 300 to scan and/or track the target. FIGS. 5-7 illustrate several embodiments of using a weather radar systems described herein and they will be described in detail below.

Display Weather Information on a Radar System

Figure 8:
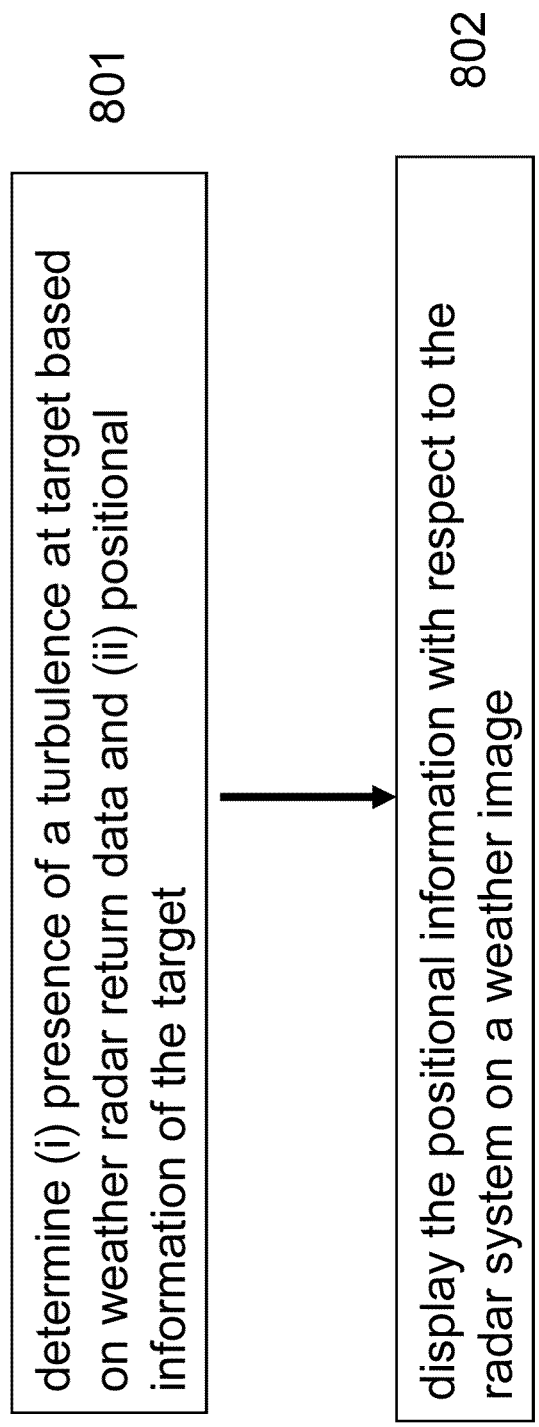
FIG. 8 is a flowchart showing at least some of the processes involved in one embodiment.

In one aspect, a weather radar system is provided. The system may be an aviation display, such as an aviation display aboard an aircraft. The system may include various electronic components, including processing electronics as provided above. The processing electronics may be configured to perform or execute a variety of functions. FIG. 8 provides a flowchart showing the processed involved in one embodiment.

As shown in FIG. 8, the processing electronics may be configured to determine (i) a presence of a turbulence at a target based on the weather radar return data received from an input device as a result of at least one scan of the target and (ii) positional information of the target (801). In one embodiment, turbulence can be determined from weather radar return data, such as spectral width parameters. The positional information may include at least one altitudinal coordinate of at least one of the target and the turbulence. The processing electronics may be configured to display the positional information with respect to the radar system on a weather image on a vertical situation display (802).

Positional information described herein may refer to any information that describes the spatial location of the target with respect to the radar system. In some embodiments, the positional information may include altitudinal, latitudinal, longitudinal coordinates, or combinations thereof. In some other embodiments, the positional information may refer to the spatial location of the target relative to the radar system. For example, the positional information may include the distance and/or azimuth of the target relative to the radar system. The positional information may also include a combination of any of the aforementioned spatial location information.

The positional information may also be employed to describe the size (or extent) of an entity, depending on the context. For example, by determining the several coordinates (e.g., altitudinal, latitudinal, and/or longitudinal) of a weather pattern, one would be able to derive the size of the pattern. In some embodiments, the radar can scan or sweep the target in several planes at a number of different altitudinal coordinates. As a result, planar information at several altitudes may be obtained and a weather pattern, such as a turbulence, may be interpolated based on the planar information at the various altitudinal coordinates. The scans may be horizontal scans, vertical scans, or both. FIGS. 7(*a*) and 7(*b*) provide schematic illustration of a horizontal scan and a vertical scan, respectively, in one embodiment.

In some embodiments, depending on the weather pattern of interest, a horizontal scan may be performed (e.g., via a number of planes at scans at different altitudinal coordinates), as shown in FIG. 7(*a*). As shown in FIG. 7(*a*), the planes need not be parallel to one another; rather, they may be scanned at least one tilt angle. In some other embodiments, the radar can scan the target via vertical scans with respect to the latitudinal and longitudinal coordinates and/or with respect to the radar system, as shown in FIG. 7(*b*). The vertical scans may be scanned from top to bottom, or from bottom to top, or both (e.g., via alternation), in a vertical direction. As a result, vertical cross-sectional information may be obtained and a weather pattern, such as turbulence, may be received.

In some embodiments, positional information may be used to generate information about the target (or "target information"). In some embodiments, the target information may be, for example, respective direction and distance coordinates oriented to the aircraft of the target. The radar system may scan the target more than once, both at the same coordinates or at different coordinates (e.g., different planes as described above). The plurality of scans can be carried out at any time interval selected by the user. In some embodiments, the positional information may be updated in response to a subsequent scan of the target.

The weather image may be displayed on any suitable display, depending on the application. For example, the display can be an aviation display, which may include a VSD, HSI, map, and the like. In some embodiments, a vertical situation display (or "VSD") may refer to an electronically generated display on which information on aircraft attitude and heading, flight director commands, weapon aiming and terrain following can be presented, choice of presentation being under the control of the pilot. In some embodiments, the horizontal situation indicator (or "HSI") may refer to an aircraft instrument normally mounted below the artificial horizon in place of a conventional heading indicator.

Figure 9:
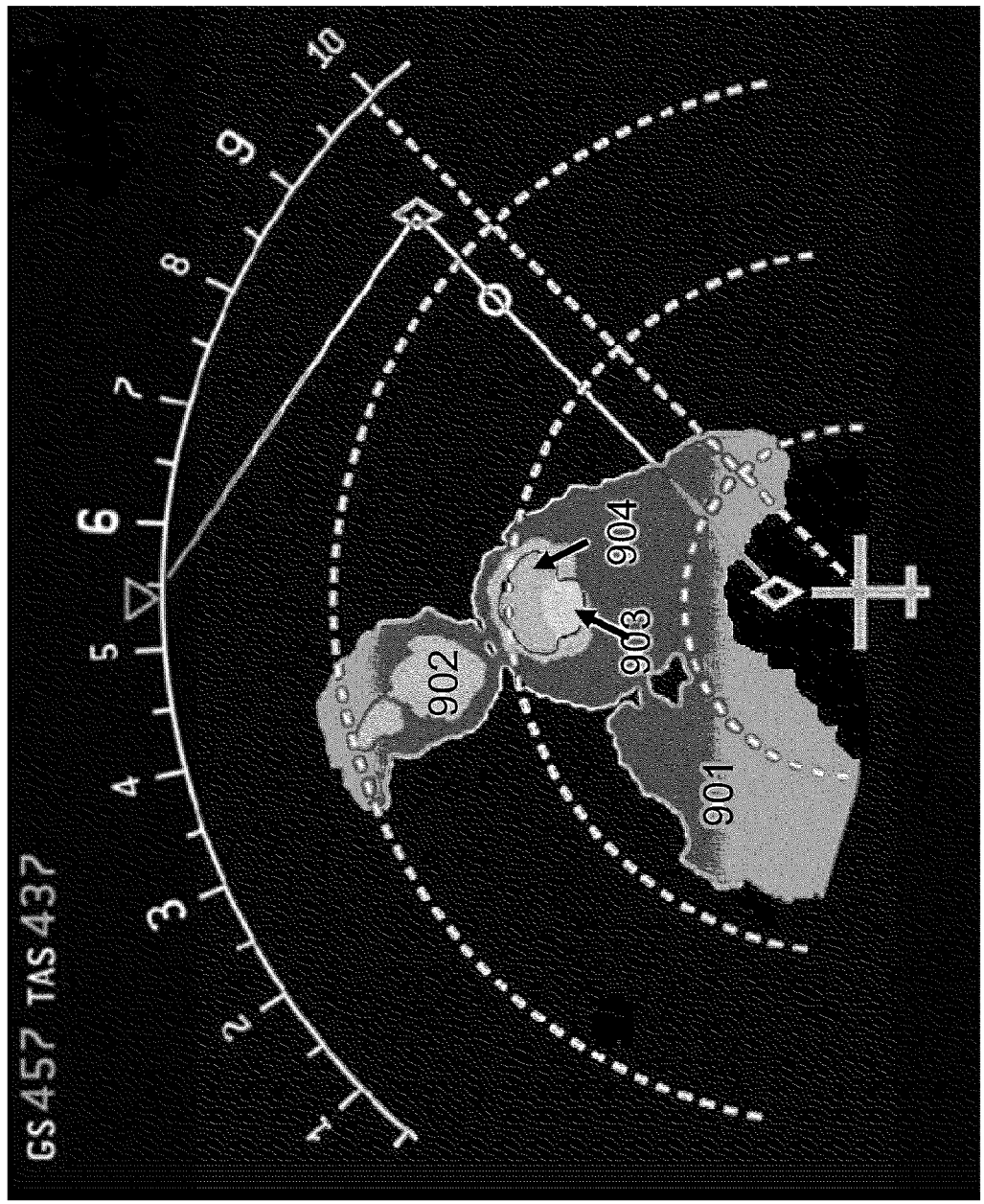
FIG. 9 provides a schematic illustration of weather output on an HSI according to an exemplary embodiment.
Figure 10:
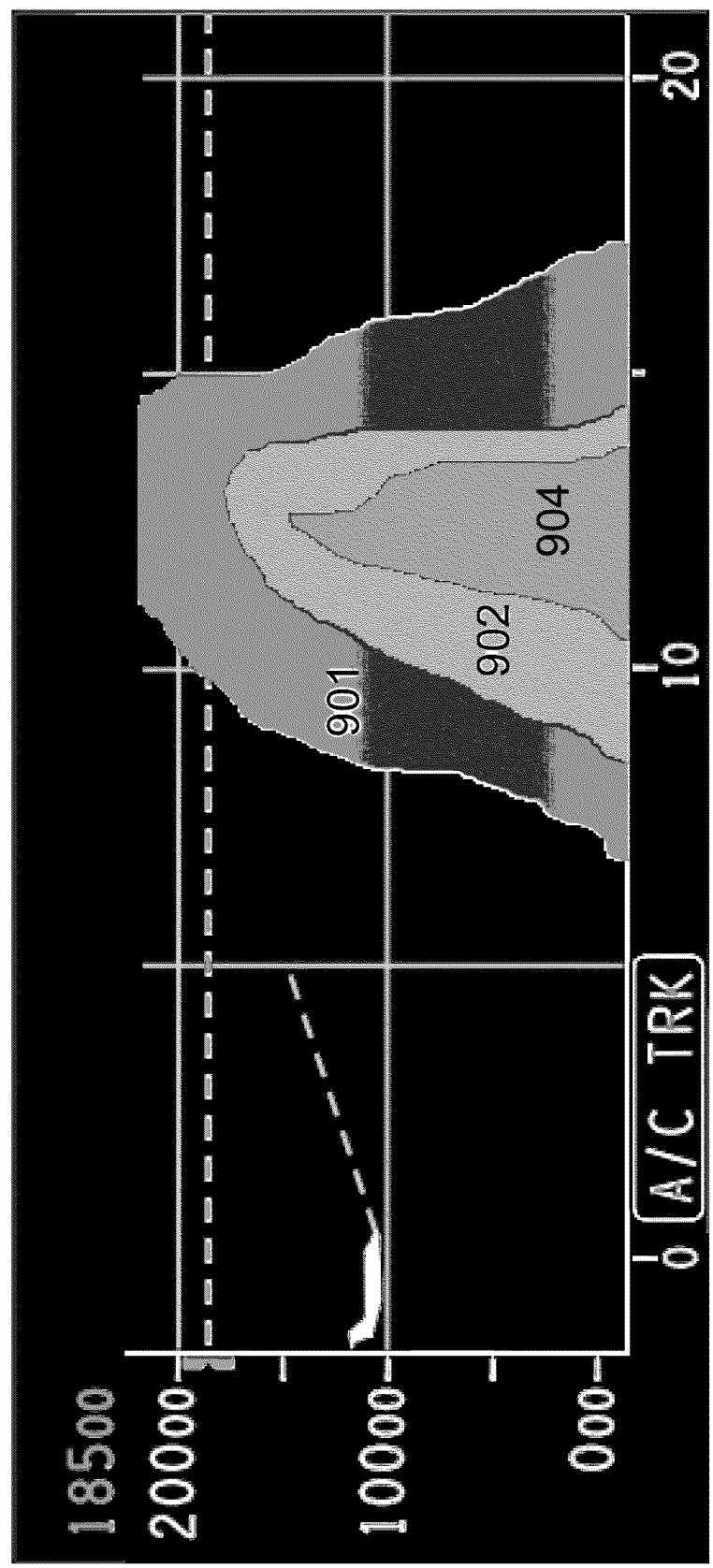
FIG. 10 illustrates a vertical weather profile on a conventional VSD, on which turbulence is not displayed.

A schematic illustration of an HSI image in one exemplary embodiment is shown in FIG. 9. An HSI may be employed to display weather information, including the relative location of any particular weather pattern, with respect to an aircraft (as shown by the aircraft symbol in FIG. 9). In FIG. 9, area 901 represents areas with light rainfall. Area 902 may represent areas with severe rainfall. Areas 904 represent the most severe rainfall. Areas 903 represent turbulence. The representation may be illustrated by different colors, shades, or any suitable graphical representations, and the designation of the type of representation for each weather pattern can be defined by a user or automatically by a computer system. The definitions of the respective weather pattern can be those commonly understood in the art or can be defined by a user in advance. For example, according to Aeronautical Information Manual, there can be four categories of turbulence: light, moderate, severe, and extreme. Each of these categories can have its own graphical representation on the HSI.

An HSI may also show the flight path of the aircraft, including the current location of the aircraft (as shown by the symbol of an aircraft in the figure), and the destination (inverse triangle in the figure). An HSI may also show transitory destinations for the aircraft to divert its path to, in the case of a particular weather pattern (e.g., turbulence). See the diamonds in FIG. 9. Depending on the situation, the type of weather pattern(s) to avoid can be determined by a user or receiver of the radar return data (e.g., pilot). For example, in the scenario as shown in FIG. 9, it would be desirable to avoid several weather conditions, including turbulence 903 and/or severe rainfalls 902 and 904. For example, the aircraft in FIG. 9 is about to turn right to avoid severe weather conditions and then get back to the original track. Solid line represents the planned maneuver path.

In one aspect, a weather radar system provided herein may be used to display weather information, including areas of turbulent weather, similar to the traditional representation on HSI or map. The weather information can be displayed on a VSD.

Figure 11:
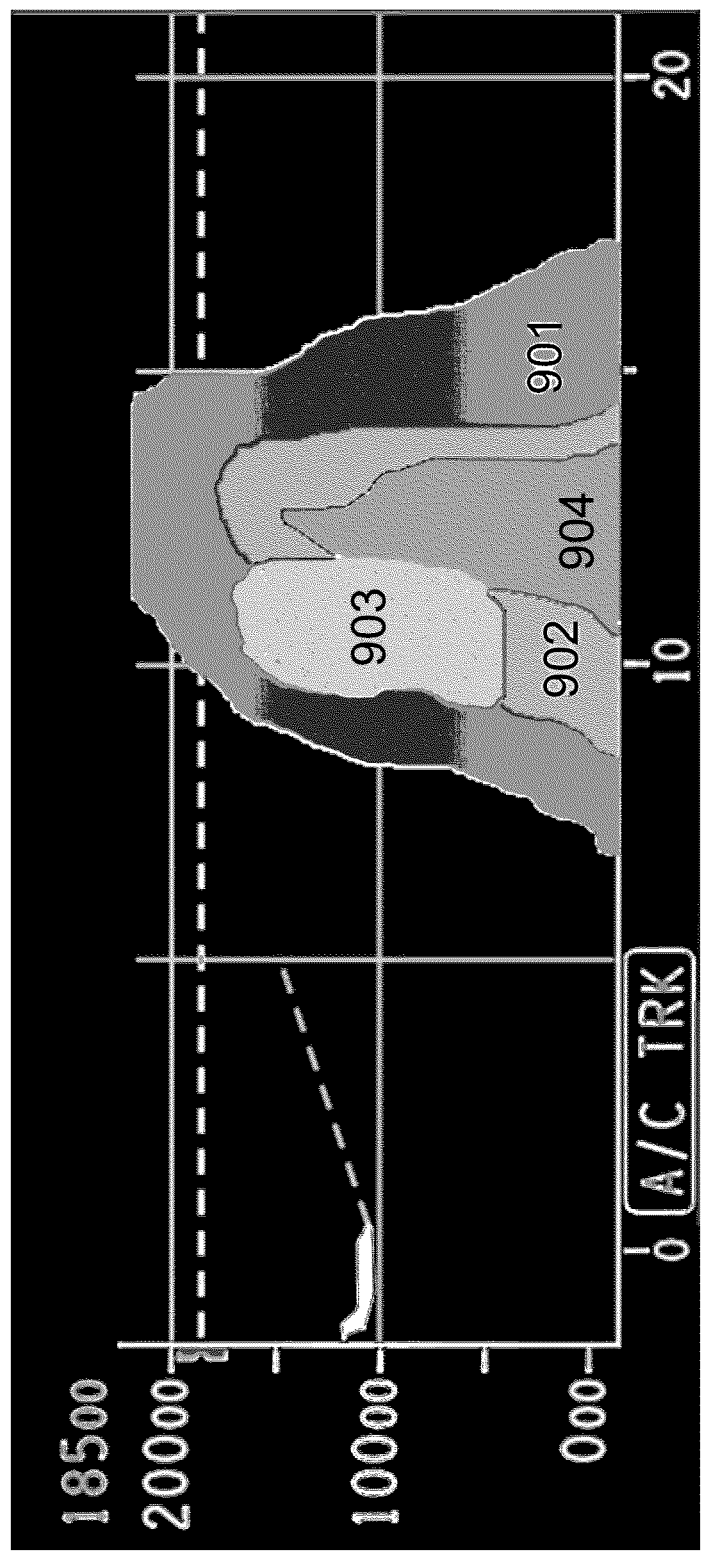
FIG. 11 illustrates a vertical weather profile, including information related to turbulence, on a VSD according to an exemplary embodiment.

The weather radar system provided herein may be used to display weather information, including areas of turbulent weather on a VSD. FIG. 11 provides an illustration of a VSD display according to one embodiment. As shown in the figure, the turbulence information is provided on the VSD. In one embodiment, turbulence display data are sent to VSD in the same way that the weather data are communicated from the radar to the VSD. Accordingly, the information displayed on the VSD may be consistent with that on the other instrumentations. Furthermore, because turbulence information is displayed on the systems described herein, the user (e.g., pilot) may have an opportunity to make an alternative decision to the original path—e.g., diverting from the originally planned path, as shown in FIG. 9. The system described herein may be equipped to prompt the user to make an alternative decision or may automatically make the decision for the user, based on a predefined software routine.

Applications

The systems and methods described herein can be employed in several applications. For example, the methods provided herein can be executed by instructions stored in a computer readable medium. The instructions may be executed by at least one processor (e.g., processor in a computer) contained in a radar system. The system, as aforedescribed, may be a part of an aviation display aboard an aircraft.

FIG. 5 shows an illustration of aircraft 101 utilizing radar system 300 to transmit first, second, and third radio frequency waves, shown as left radio frequency wave 506, center radio frequency wave 508, and right radio frequency wave 510, respectively. Left radio frequency wave 506 contacts a first (e.g., left) weather cell 502 and reflects back to aircraft 101 as a radar return. Similarly, right radio frequency wave 510 contacts a second (e.g., right) weather cell 504 and reflects back to aircraft 101 as another radar return. Center radio frequency wave 508 does not contact a reflective object and, thus, does not generate a radar return. It should be noted that, while radio frequency waves are described, radar system 300 may use other beam types (e.g., microwave, Lidar, etc.).

Referring to FIG. 6, components of processing electronics 304, for example image generating module 332, may be configured to generate an image 600 of a plan view of the weather and to cause image 600 to be displayed on aviation display 20. As shown, image 600 comprises left cell 502a and right cell 504a, which correspond to left weather cell 502 and right weather cell 504, respectively. A user (e.g., pilot, co-pilot, crew member, technician, etc.) desiring vertical information about weather cell 504 may select or identify weather cell 504 or right cell 504a by providing a target selection, weather cell selection, location information, direction and/or distances coordinates, an absolute location of the weather cell, latitudinal and/or longitudinal coordinates, and/or position or region of the target on display 20. For example, the user may use keypad 52 to select a cell using latitudinal and longitudinal coordinates. The user may receive these coordinates, for example, from a weather report or through communication with another aircraft. According to another embodiment, the user may use keypad 52 to enter a direction and/or distance relative to aircraft 101, for example, +15 degrees and 20 nautical miles. According to the embodiment shown, the user may use a user input device (e.g., touch sensitive surface 22 on a display 20, cursor control device 50, etc.) to select a target or region 608 on image 600. According to one embodiment, cursor 606 may move around image 600 in response to user input via cursor control device 50. When cursor 606 is shown on the desired target (e.g., right weather cell 504, right cell 504a), the user may select the target, for example, by pressing a button on cursor control device 50. According to another embodiment, cursor 606 may move around image 600 in response to user input via touch sensitive surface 22. For example, a user may drag cursor 606 to a position or over right cell 504a, and the user may select the target by performing a gesture in relation to right cell 504a (e.g., lifting off of, or tapping, the touch sensitive surface 22), or pressing a button (e.g., bezel button proximate display 20, or button on cursor control device 50). According to yet another embodiment, the user may select the desired target by performing a gesture in relation to the target (e.g., tapping or double-tapping right cell 504a).

According to an exemplary embodiment, processing electronics 304 receives the user selection of right cell 504a from the user input device. For example, user interface module 328 may receive coordinates or a position on display 20 of a gesture or cursor 606. Processing electronics 304, e.g., target location module 330, may generate target information from the user input received from the user input device. Processing electronics 304 provides target information to weather radar system 300 usable by radar system 300 to scan the target. For example, beam control module 334 may provide a direction and/or distance to weather cell 504 or may provide latitudinal and longitudinal coordinates of weather cell 504.

Referring to FIG. 2 and to FIG. 7, which show a schematic elevation view illustration of aircraft 101 scanning weather cell 504, according to an exemplary embodiment, radar system 300 conducts a first horizontal sweep, projecting a first beam in plane P1 and generating a first set of radar return data. Radar system 300 then adjusts the tilt angle 108 upward and conducts a second horizontal sweep, projecting the second beam in plane P2 and generating a second set of radar return data. Radar system 300 may then adjust the tilt angle 108 upward again and conduct a third horizontal sweep, projecting the third beam in plane P3. Plane P3 is above weather cell 504 and does not generate radar return data. According to various embodiments, radar system 300 may adjust tilt angle 108 upwards or downward (e.g., recursively) until the horizontal sweep passes through the echo top of the cloud. Radar system 300 and/or processing electronics 304 may infer (e.g., interpolate, extrapolate, model, etc.) the altitude of the echo top from two sets of radar return data. According to various embodiments, the user may have selected a target that is below aircraft 101. Accordingly, the first horizontal sweep may not generate radar return data, and radar system 300 may adjust the tilt angle 108 downwards for subsequent horizontal sweeps until the echo top of weather cell 504 is identified. According to another embodiment, radar system 300 may conduct one or more vertical sweeps to determine the altitude of the echo top of weather cell 504 and may obtain a vertical profile of weather cell 504. The vertical sweeps may include sweeping the tilt angle 108 along a vertical plane, and conducting the sweeps at spaced apart horizontal angles. Radar system 300 and/or processing electronics 304 may determine the altitude of the echo top based on the tilt angle 108 of the radar system 300, the distance to the target, and an altitude of aircraft 101, which may be received from avionics equipment 312. One system and method for characterizing the altitude of the echo top of a weather cell that may be used with radar system 300 is described in U.S. Pat. No. 7,307,577 to Kronfeld et al., which is hereby incorporated by reference in its entirety.

The articles "a" and "an" are used herein to refer to one or to more than one (i.e., to at least one) of the grammatical object of the article. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A weather radar system, wherein the weather radar system is a part of an aviation display aboard an aircraft, comprising: processing electronics configured to:
    determine (i) a presence of a turbulence at a target based on a weather radar return data received from an input device as a result of at least one scan of the target and (ii) positional information, which comprises at least one altitudinal coordinate of at least one of the target and the turbulence;
    display the positional information, including an overlay of an altitude axis, with respect to the weather radar system on a weather image on a vertical situation display,
    receive user input to select a weather cell of the weather image;
    control a radar antenna to scan the selected weather cell; and
    display a maneuver path for the aircraft to avoid the turbulence on the weather image on the vertical situation display.

2. The system of claim 1, wherein the turbulence is at least one of light, moderate, severe, and extreme turbulences.

3. The system of claim 1, wherein the positional information further comprises at least one of latitudinal and longitudinal coordinates of at least one of the target and the turbulence.

4. The system of claim 1, wherein the processing electronics are further configured to generate a target information from the positional information, which further comprises at least one of latitudinal and longitudinal coordinates, wherein the target information comprises respective direction and distance coordinates corresponding to the aircraft and the target.

5. The system of claim 1, wherein the processing electronics are further configured to update the positional information to be displayed in response to a subsequent scan of the target.

6. The system of claim 1, wherein the processing electronics are further configured to scan the target via at least one vertical plane with respect to latitudinal and longitudinal coordinates or with respect to the weather radar system.

7. The system of claim 1, wherein the processing electronics are further configured to display the positional information with respect to a distance to the weather radar system on the weather image.

8. The system of claim 1, wherein the processing electronics are further configured to interpolate the turbulence based on a plurality of the at least one altitudinal coordinates in the positional information.

9. The system of claim 1, wherein the processing electronics are further configured to prompt a user to make an alternative decision based on the weather data displayed.

10. A method for displaying weather information at a target on a vertical situation display of an aircraft, the method comprising:
    determining (i) a presence of a turbulence at a target based on weather radar return data received from an input device as a result of at least one scan of the target and (ii) positional information, which comprises at least one altitudinal coordinate of at least one of the target and the turbulence;
    displaying the positional information, including an overlay of an altitude axis, with respect to the weather radar system on a weather image on the vertical situation display,
    receiving user input to select a weather cell of the weather image;
    controlling a radar antenna to scan the selected weather cell; and
    displaying a maneuver path for the aircraft to avoid the turbulence on the weather image on the vertical situation display.

11. The method of claim 10, wherein the positional information further comprises at least one of latitudinal coordinate and longitudinal coordinate of at least one of the target and the turbulence.

12. The method of claim 10, further comprising displaying the positional information of the target in a plan view on a weather image.

13. The method of claim 10, further comprising generating a target information from the positional information, which further comprises at least one of latitudinal and longitudinal coordinates, wherein the target information comprises respective direction and distance coordinates with respect to the aircraft and the target.

14. The method of claim 10, further comprising interpolating the turbulence based on a plurality of the at least one altitudinal coordinates in the positional information.

15. A non-transitory computer readable medium having instructions stored therein, the instructions being executable by at least one processor to execute a method of displaying weather information on a vertical situation display of an aircraft, the method comprising:
    determining (i) a presence of a turbulence at a target based on weather radar return data received from an input device as a result of at least one scan of the target and (ii) positional information, which comprises at least one altitudinal coordinate of at least one of the target and the turbulence;

displaying the positional information, including an overlay of an altitude axis, with respect to a weather radar system on a weather image on the vertical situation display, receiving user input to select a weather cell of the weather image;

controlling a radar antenna to scan the selected weather cell; and displaying a maneuver path for the aircraft to avoid the turbulence on the weather image on the vertical situation display.

16. The computer readable medium of claim of claim 15, wherein the turbulence is at least one of light, moderate, severe, and extreme turbulences.

17. The computer readable medium of claim 15, wherein the positional information further comprises at least one of latitudinal and longitudinal coordinates of at least one of the target and the turbulence.

18. The computer readable medium of claim 15, wherein the positional information further comprises a distance, azimuth, or both, of the target relative to the weather radar system.

19. The computer readable medium of claim 15, wherein the method further comprises transforming the location information into target information, the target information being usable by the weather radar system to direct a radar beam toward the target, the weather radar system being airborne.

* * * * *